March 17, 1964     CARL-FREDRIK C. LOVEN     3,125,204
WORK STATION TYPE CONVEYOR
Filed July 3, 1961                                      5 Sheets-Sheet 1
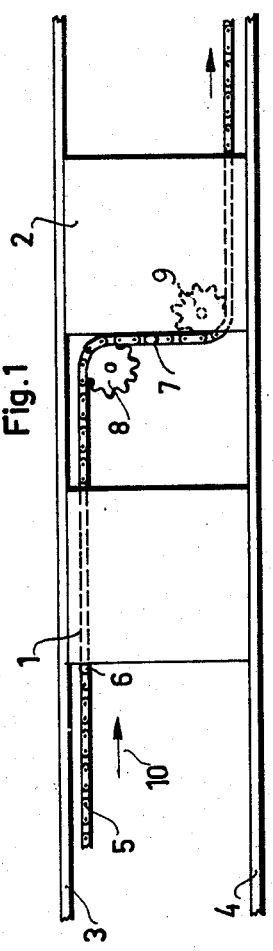
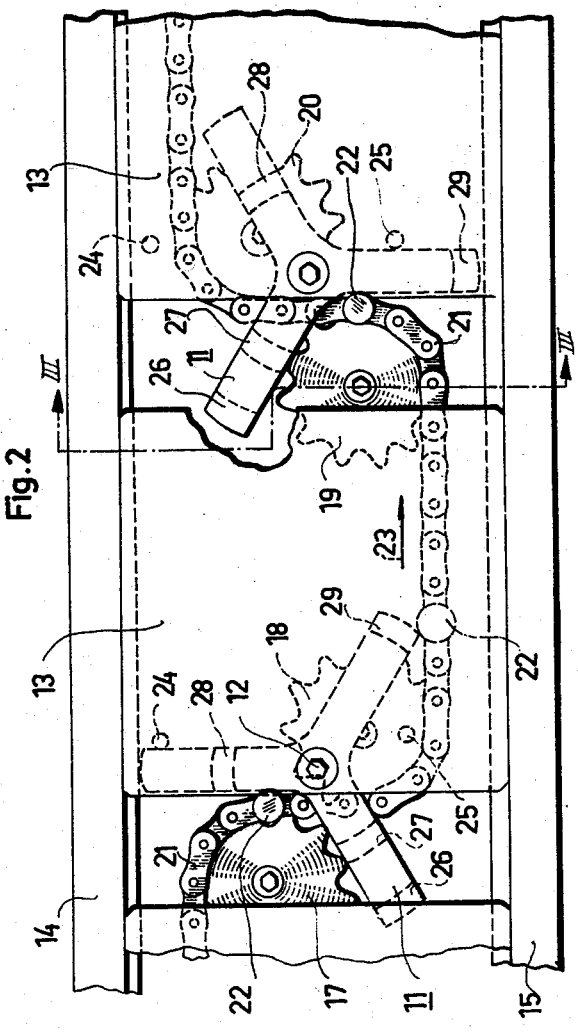

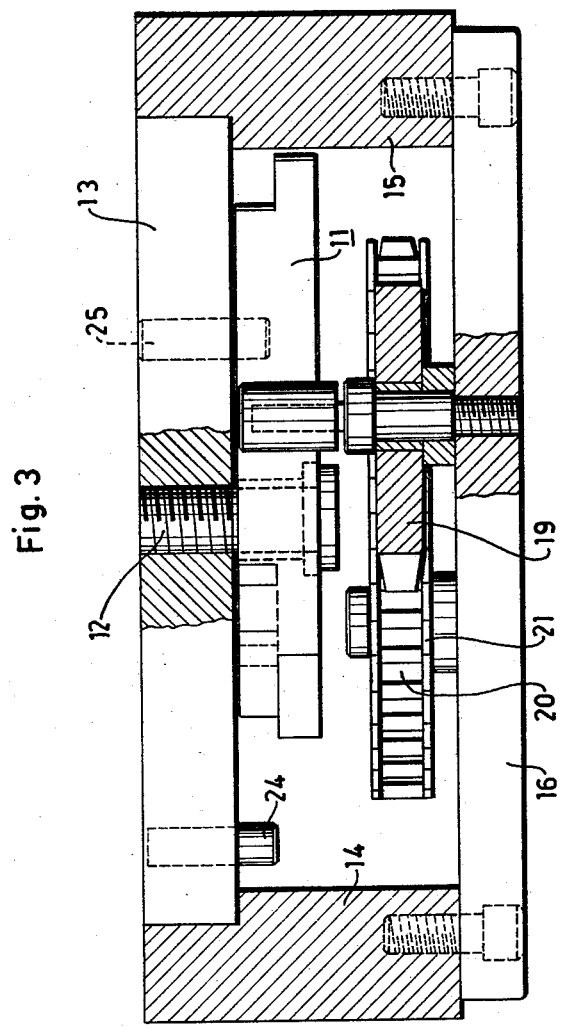

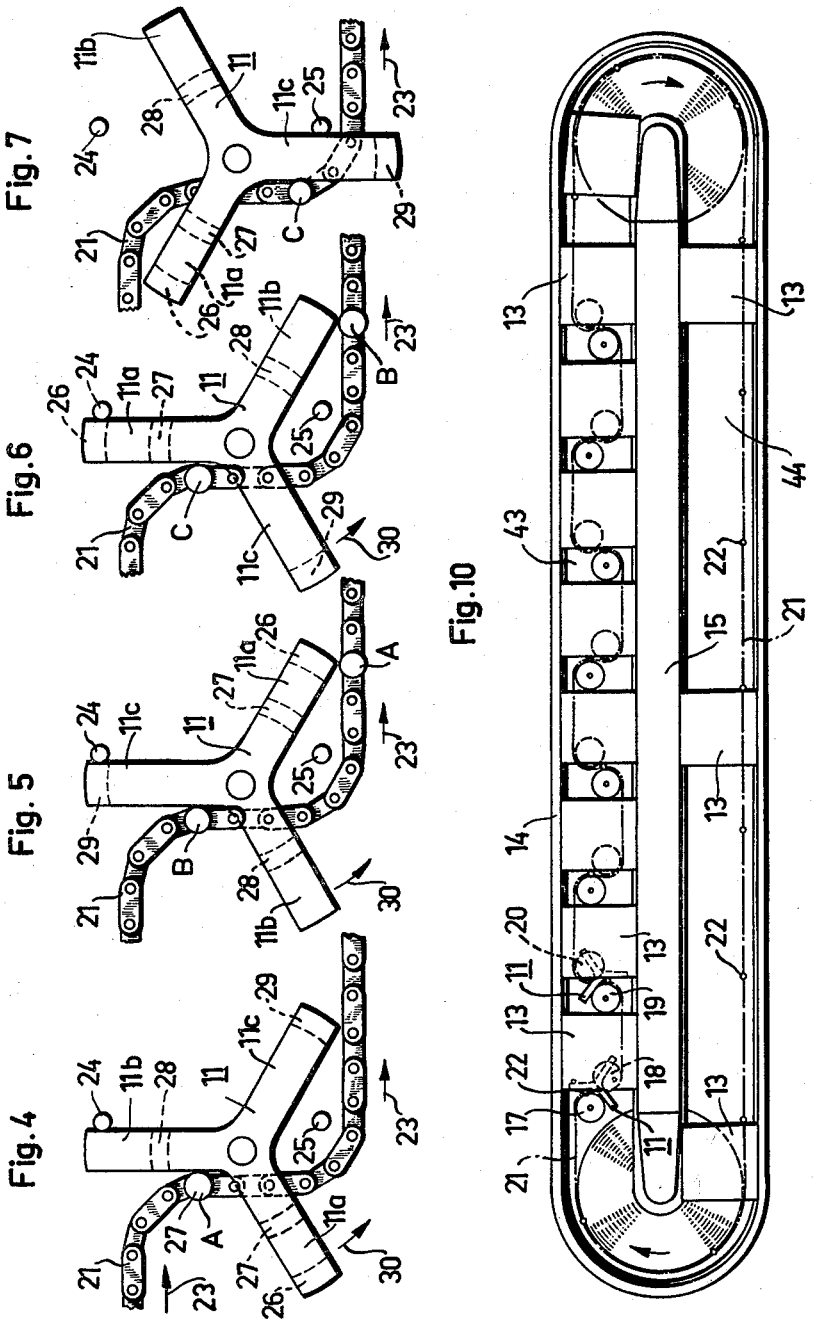

March 17, 1964   CARL-FREDRIK C. LOVEN   3,125,204
WORK STATION TYPE CONVEYOR
Filed July 3, 1961   5 Sheets-Sheet 4
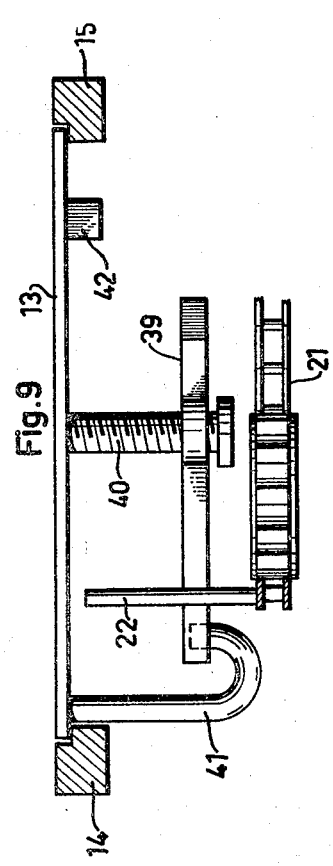
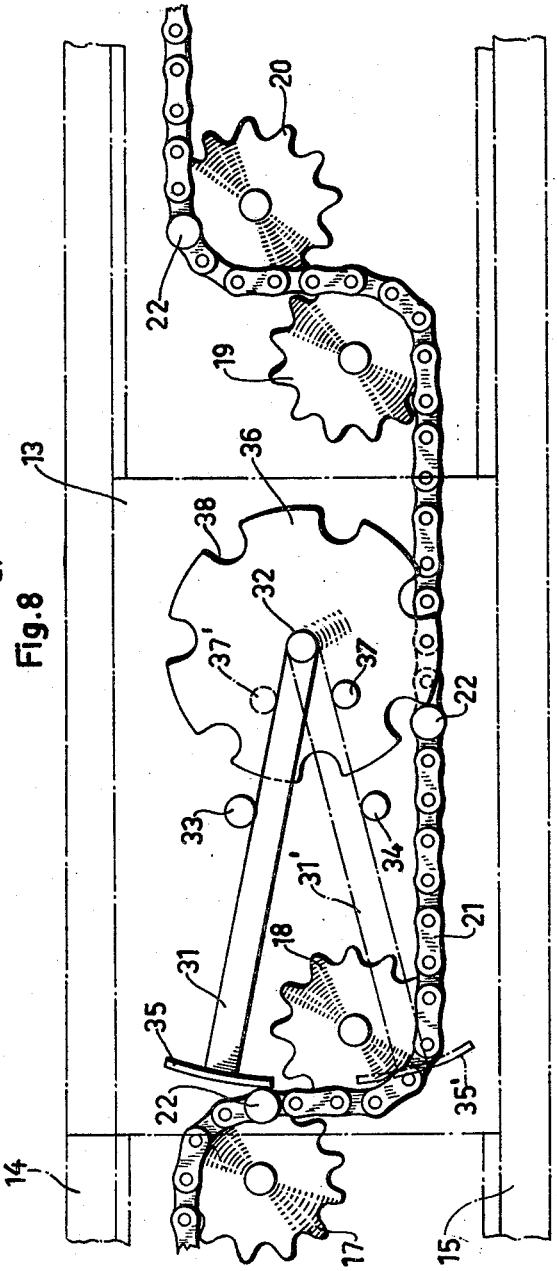

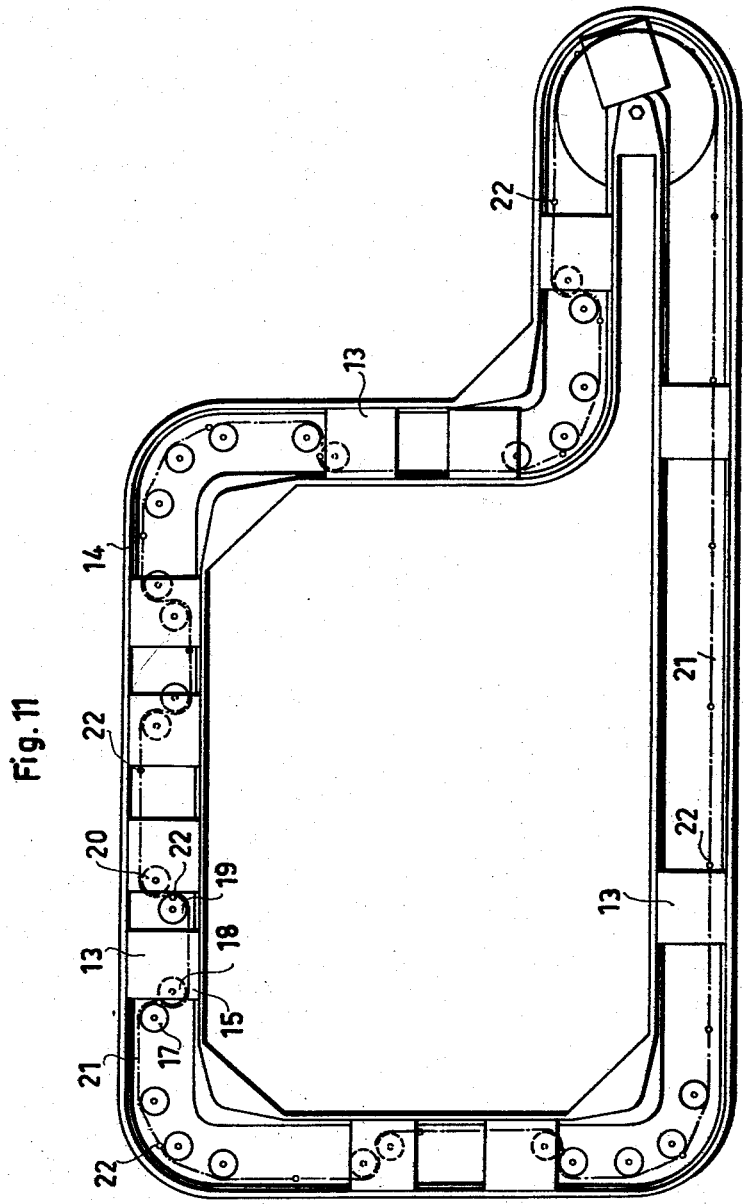

United States Patent Office 3,125,204
Patented Mar. 17, 1964

3,125,204
WORK STATION TYPE CONVEYOR
Carl-Fredrik Christian Loven, Satuna, Bjorklinge, Sweden
Filed July 3, 1961, Ser. No. 121,443
Claims priority, application Sweden July 6, 1960
8 Claims. (Cl. 198—19)

The present invention relates to a device for transferring workpieces and the like, especially in plants for series fabrication. In modern industry it is common practice to use plants in series fabrication which include conveying devices for transferring the workpieces between various work stations. A usual type of such plants comprises a track upon which platens are displacably arranged, which carry the workpieces, fixtures etc. in question. The platens are usually connected to a conveyor chain, or secured by means of links to the same, and the track is generally constructed as an endless track. However, such plants suffer from considerable practical limitations as regards the number of component platens and the length of the track. If a large number of platens are to be included in such a plant, the combined mass of platens will be very considerable which results in appreciable forces to be used for acceleration and deceleration of the platens as they move between work stations, as all platens must be started and stopped simultaneously. A considerable and inevitable lost motion between the platens arises on account of play in the chain, of the same type as that occurring in acceleration and deceleration of long railway trains. Such a lost motion may be very inconvenient in long conveying plants within a factory.

In order to avoid such a lost motion it has previously been proposed to construct plants in which the component platens are caused to push each other in a long line in the movement between work stations. Further there are plants in which the platens are moved by means of a reciprocating rod provided with fingers for engaging the platens. Such plants have the limitations that a large number of platens are required, also, that all platens must be pushed at the same time, which may involve disadvantages concerning the efficient utilizing of the plant, should the working period at the various stations vary. The object of the present invention is to avoid the above mentioned drawbacks and to provide a plant in which the conveying of the workpieces and/or the platens takes place separately and independently of the platens which are dwelling at the respective work stations, and in which the dwell time at the work stations may be pre-adjusted to the same or a different value for the individual stations.

The device according to the present invention for conveying workpieces and the like, preferably disposed on platens, carriers or the like, includes a conveying device provided with pushing members for co-operation with the platens, and is chiefly characterized by the feature that the conveying device is adapted, for effecting an interruption of the displacement of the platens at predetermined points or work stations along the travelling path of the platens, to turn off into a path essentially parallel to that edge or abutment face of the platens with which the pushing members are adapted to co-operate, and then to turn off again to a travelling direction in which the conveying device is feeding the platens along.

The invention will be described in greater detail with reference to the annexed drawings. FIG. 1 shows, by means of a simple embodiment, the principle of the present invention, and FIG. 2 shows a further embodiment having a device for extending the dwell time at the work stations. FIG. 3 is a section along line III—III in FIG. 2. FIGS. 4, 5, 6, and 7 show various stages of operation of the dwell time determining device of FIG. 2. FIGS. 8 and 9 show further embodiments of devices determining the dwell time in plan view and elevation, respectively. FIG. 10 shows a plant in the form of a conveying track provided with devices according to the invention, and FIG. 11 shows a larger similar plant, both plants in plan view.

The arrangement shown in FIG. 1 is a section of a plant and comprises platens 1, 2 which are slidably disposed between guide rails 3, 4. A conveyor chain 5 is provided with pushing members in the form of pins 6, 7 projecting from the chain. As illustrated in the drawing, the chain is adapted first to run parallelly with and adjacent to the guide rail 3 and then to turn off about a sprocket 8 so as to run essentially perpendicularly to the longitudinal direction of the guide rails and parallelly with the free edges of the platens 1, 2. After that the chain turns again about a further sprocket 9 so as to run parallelly with and adjacent to the guide rail 4. In those positions wherein the parts are shown in FIG. 1, the platen 1 is being pushed in the direction of the arrow 10 under the action of the pushing member 6 on the chain 5. On the other hand, the platen 2 is dwelling, as the pushing member 7 on the chain in this case does not actuate the free edge of the platen but is only moving parallelly with said edge. Hence, the conveying procedure will be the following (to begin with platen 2 is disregarded): The platen 1 is displaced with the same speed as the running speed of the chain until the pushing member 6 reaches the sprocket 8, where the chain and thus also said member obtains a new direction of motion, essentially perpendicular to the first mentioned direction. In doing this the platen 1 will be successively decelerated to a standstill and assume a position corresponding to that of the platen 2 according to FIG. 1. As soon as the pushing member has reached the sprocket 9, the platen will again be actuated in the direction of the arrow 10 and be successively accelerated to the running speed of the chain. In the arrangement according to FIG. 1 the platen 1 will thus approach the platen 2 right up to the moment when the pushing member 7 reaches the sprocket 9. The platen 2 will then be conveyed together with the chain 5 and leave room for the platen 1 which assumes the position of platen 2 in the manner described. By such an arrangement a smooth deceleration and acceleration of the platens is thus attained, no large interconnected masses having to be actuated, as in known devices with concomitant lost motions when the platens are retarded to stop at the stations. Furthermore, the displacement of platens between work stations takes place completely independently; some are moving while others are dwelling.

In an arrangement according to FIG. 1 the dwell time of the platens at each station may be readily determined, within certain limits, by adjusting the distance between sprockets 8 and 9, that is, varying the length of the path the chain has to travel parallelly to the free edges of the platens. However, such a method of determining the dwell time is limited with regard to the space available between the guide rails 3 and 4 and to the feeding speed of the chain.

In order to extend the dwell time at the respective work stations without unnecessarily reducing the feeding speed of the chain, another arrangement is proposed according to the invention, which arrangement is illustrated in FIGS. 2–7, only a section of the plant being shown, as in FIG. 1. This arrangement comprises a three-fingered lever 11 which is rotatably carried by means of a bolt 12 adjacent one free edge of each platen 13. As in FIG. 1, the platens are displaceably arranged between guide rails 14, 15 secured to a base plate 16 (FIG. 3) upon which sprockets 17, 18, 19, 20, likewise as in FIG. 1, are disposed for guiding a conveyor chain 21, the chain being provided with pushing members in the form of pins 22. The chain is adapted to run in the direction shown by the arrow 23. The shanks 11a, 11b and 11c (FIGS. 4–7) of the lever 11 are intended to co-operate, in a manner as stated below, with stops 24, 25 disposed on the underside of each platen 13 and are actuated by the pushing members 22 on the chain 21. Said shanks 11a, 11b, and 11c are provided with grooves for permitting them to pass freely past some of said stops. Thus the shank 11a is provided with two grooves 26, 27 allowing free passage of said shank past both stops 24 and 25. The shank 11b is provided with a groove 28 permitting it to pass freely past the stop 25, and the shank 11b is provided with a groove 29 permitting free passage past stop 24.

For a disclosure in greater detail of the mode of operation of the device determining the dwell time, reference is made to FIGS. 4–7, where only the three-fingered lever 11 and the part of the conveyor chain 21 coacting with the same are shown, only three successive pushing members 22 being considered, here designated by A, B, and C. In the situation of FIG. 4 it is assumed that the pushing member A has actuated the shank 11b, which engages the stop 24 in the conveying direction of the chain, the pushing member thus having moved the platen to the stational location in question. Upon further movement of the pushing member A it will actuate the shank 11a and rotate the lever in the direction shown by the arrow 30. During its continued rotation the shank 11a will pass the stop 25 (by receiving it in groove 27) and the shank 11c will pass the stop 24 (received in groove 29) until the lever assumes the position shown in FIG. 5, after which the pushing member A slides out of contact with the shank 11a. In the meantime a further succeeding pushing member B has arrived at a position corresponding to that of member A in FIG. 4. The member B will actuate and turn the shank 11b, in doing which the latter will rotate past the stop 25 (this being received in groove 28) and the shank 11a will pass the stop 24 (received in groove 26) until the lever has assumed a position as shown in FIG. 6 where the last mentioned member slides out of engagement with the shank 11b. In the meantime a third pushing member on the chain has arrived at the shank 11c, which it actuates and turns in a similar way. On account of the fact that the shank 11c has no groove for permitting free passage of the stop 25, the turning motion of the lever will be blocked when said last mentioned shank engages the stop 25. The pushing member C will now exert a thrust on the edge of shank 11c, which causes the platen 13 to start a displacing movement and to travel, as soon as said pushing member has left the sprocket 18, at the speed of the conveyor chain to the next station, that is, at the pair of sprockets 19, 20. Here said pushing member will slide along the shank 11c while passing about the sprocket 19 and then actuate the shank 11a, in doing which the lever is rotated in a direction opposite that of arrow 30, after which the procedure described above repeats itself, although in the reversed order, until the lever has assumed a position as in FIG. 4, i.e. having its shank 11b making contact engagement with the stop 24. In this position the platen 13 will be moved once more, upon actuation by a pushing member 22, to a succeeding stational location, where the procedure according to FIGS. 4–7 is repeated.

Within the scope of the invention of course also a two-fingered lever may be used for the same purpose although a shorter dwell time is obtained (a dwell time equal to the interval between the passage of two pushing members). Levers having more than three shanks as well as such differently spaced angularly may be conceived for special purposes.

FIG. 8 shows a further embodiment for providing a comparatively long dwell time at the stations. This device comprises a lever 31 pivoted on a stud 32 secured to a platen 13. This lever is swingable between two stops 33, 34. At the end of the lever 31 a buffer-like shield 35 is arranged for co-operation with the pushing members 22 on the chain 21. A disk 36 is rotatably carried on the stud 32. This disk 36 is provided with a pushing pin 37, and along its periphery the disk is provided with a number of notches 38 for co-operation with the pushing member 22 on the chain.

The device operates in the following way: Let it be assumed that the lever 31 and the disk 36 are in the positions shown by solid lines in FIG. 8. As soon as a pushing member 22, which has displaced the platen 13 by actuating the buffer shield 35 and the lever 31, arrives at a station, the pushing member will slide out of contact with said buffer. After passing the sprocket 18 of the station the pushing member will engage one of the notches 38 in the disk 36 and turn the latter an angle corresponding to the pitch of said notches. The pushing pin 37 will then move the corresponding distance. During passage of the pushing members 22 the pushing pin 37 will be successively moved up to a position contiguous to the lever 31, as shown by dotted lines. As soon as a further pushing member arrives into engagement with the relevant notch 38 in the disk 36, the lever 31 will be turned down to the position indicated by dotted lines. When a successive pushing member on the chain 21 has passed the sprocket 17 it will engage the buffer 35 and thus, after having passed the sprocket 18, commence to convey the platen. As soon as the platen has been moved to the subsequent stational location with sprockets 19, 20, the corresponding procedure will be repeated, although in the reversed order. The embodiment latest described would seem to be applicable only in those cases when the underside of the platen need not be utilized for the working process, to which a workpiece on the platen is to be subjected.

FIG. 9 shows an elevation of a further embodiment for settling the dwell time at a work station. This embodiment comprises a, for instance, three-fingered lever 39 threadingly enmeshed with a screw spindle 40 disposed on the underside of the platen 13. Said lever is intended to co-operate with two stops 41, 42 located on different levels. The device operates in such a way that the lever 39 rides like a nut up along the spindle 40 for each pushing member 22 passing the device, the lever reaching the stop 42 after a predetermined number of pushing members 22 having passed. Further rotation is interrupted at said stop 42 and the pushing member may again actuate the platen 13 for conveying. A resetting screwing down of the lever 39 takes place, as in the embodiments previously disclosed, at a subsequent work station. The embodiment now described requires comparatively long pushing members 22 to be arranged and also means for effecting an adjusted rotational friction between the lever 39 and spindle 40 so as to avoid self-rotation.

According to the invention it is also possible to arrange displaceable or withdrawable abutment faces on the plates for co-operation with the pushing members of the chain. Such abutment faces may be formed as a slide or the like slidably arranged below each platen and actuable from a point outside any of guide rails 14, 15, either manually or automatically. In this way the dwell time may be freely selected as regards to the working conditions in question at a station. However, taking the other platens occurring in the plant into consideration, provision must be made that interference is avoided.

Moreover, according to the invention the stations may be distributed freely along the conveying path of a plant, taking the other manufacturing conditions in question into account. By arranging together the pairs of sprockets 17, 18 or 19, 20, each pair determining a station, on displaceable platforms, the position of the stations may be readily settled merely be displacing and locking the platforms at the desired points along the path.

Hence, a plant provided with devices according to the present invention is very flexible. For instance, while maintaining the accuracy in moving the platens and the locations of the stations, various working or manufacturing steps may to advantage be located in various departments within a factory, the platens being transported between the various departments, which contain work stations, by means of said chain of the device, such as in an ordinary conveying track.

In the embodiments of the present invention braking members or arresting means may be arranged on the platens or at the respective stations when required so as to retain the dwelling platens in the position set. Within the scope of the invention such means could of course be made manually and/or automatically operable.

FIG. 10 shows a fabrication plant according to the assembly line principle, to which plant the present invention is applied. For effecting a certain dwell time at the various stations a device according to FIGS. 2-7 is used on each platen, although only the two first platens are shown having such devices. As will be seen from the figure the machining of the work pieces on the platens is concentrated to the second run 43 of the plant, where the necessary stations are arranged, while the run 44 is used for returning the platens 13. Along the run 44 only every third pushing member 21 on the chain 22 will move a platen 13 by means of the device on the platen determining the dwell time. This involves a considerable saving of the number of platens required in relation to conventional plants.

FIG. 11 shows how the present invention may be applied to a plant in factory premises where it is essential to locate the conveying track with regard to the space available. In large plants it is suitable to distribute the stations in such a way that commencing the conveying of the platens from the stations does not take place simultaneously but is evenly distributed between the various stations mutually so that, for instance, only one or a few platens are accelerating at the same time. In this way a pulsing load of the conveyor chain may be eliminated.

According to the present invention it is not necessary that the device feeding the platens is a conveying chain, but one could also use a wire or some other means provided with pushing members, which means may be caused to follow at the stations the paths described above or paths equivalent therewith.

Furthermore, it is not necessary that the conveying device actuates the platens upon which the workpieces are disposed but the workpieces themselves may be adjusted for transportation in a way consonant with that of the platens. Neither is the invention confined to the use in connection with series fabrication of articles as stated above, but it is also conceivable that the invention is applied to any conveying plant where it is required that the articles conveyed shall be brought to a standstill at certain points. A device according to the invention may be caused to operate in any plane and is thus not limited to the horizontal arrangement shown.

What I claim is:

1. A conveyor for workpieces in a production line including platens for conveying the workpieces to and from work positions giving each platen a dwell time at least one work station, said conveyor including track means defining a predetermined path for the platens, a plurality of sprockets located along said track means, a flexible element rove about said sprockets to describe a sinuous path parallel to said track means between work stations, and at right angles to said track means at said work stations, pushing members mounted on said flexible element, said platens being provided with an abutment face to be engaged by said pushing members to move the platens along said track means.

2. The conveyor of claim 1, in which said sprockets are mounted in pairs, said pairs of sprockets being movable along said track means to provide for adjustment of the location of the work stations.

3. The conveyor of claim 1, in which said abutment face on said platen is a surface perpendicular to the said track means.

4. The conveyor of claim 1, in which the abutment face of the platen is a bar pivotally secured to the platen to be displaced on said platen by said pushing member.

5. The conveyor of claim 4, in which the bar comprises a lever adapted to cooperate with two stops so that it may be turned in two steps substantially half the distance between said stops by two consecutive pushing members from a position in contact with one of the stops to a position in contact with the other of the stops and thus form an abutment face for a following pushing member on the flexible element for displacing the platen.

6. A conveyor according to claim 4, in which the abutment face comprises a swingably mounted three-fingered lever whose shanks are arranged so that a first of said shanks is caused to engage a first stop and a second shank is caused to engage a second stop, the third shank being free to pass both said stops and the first shank being free to pass the second stop and the second shank being free to pass the first stop, said shanks being adapted to be turned by a first and a second consecutive pushing member on the flexible element until either the first or the second shank arrives into engagement with the respective stop, whereby the shank in question will serve as the abutment face for cooperation with the second pushing member.

7. A conveyor according to claim 4, in which the bar comprises a rod pivoted on the platen and swingable between two stops, a buffer-like device disposed at the end of said rod, a toothed disc mounted to be rotatable about the fulcrum of the rod and engageable by the pushing members on the flexible element, a pushing pin on said toothed disc adapted to engage said rod, said rod being transferred from one limit position to the other between said stops by said pushing pin upon rotation of said toothed disc so that the buffer-like device is caused to engage a following pushing member on the flexible element for displacing the platen.

8. A conveyor according to claim 4, in which the bar comprises a screw spindle mounted on said platen, a multi-fingered element rotatably mounted as a nut on said screw spindle, said fingers of said multi-fingered element being successively engageable by successive pushing members of the flexible element to ride like a nut along the screw spindle, and two stops fixedly mounted on said platen and located on different levels, whereby, dependent on the direction of rotation of the multi-fingered element, one or other of said stops will be engaged by said multi-fingered element to provide said abutment face.

References Cited in the file of this patent

UNITED STATES PATENTS 2,886,165     Eger    ------------------ May 12, 1959